United States Patent [19]
Cooley et al.

[11] Patent Number: 5,775,809
[45] Date of Patent: Jul. 7, 1998

[54] VEHICLE COMPARTMENT TEMPERATURE RECORDER

[75] Inventors: Harold J. Cooley, New City, N.Y.; Lawrence C. Bischoff, Hopatcong, N.J.; Ernest W. Delany, North Kingstown, R.I.; Frank Pagano, Randolph, N.J.; Mark A. Sitcoske, Barrington, R.I.; Georgiy V. Yaroshevskiy, Verona, N.J.

[73] Assignee: Measurement Dynamics LLC, Dover, N.J.

[21] Appl. No.: 679,703

[22] Filed: Jul. 11, 1996

[51] Int. Cl.$^6$ .................................................... G01K 7/00
[52] U.S. Cl. .......................... 374/164; 374/166; 364/557
[58] Field of Search .................................. 374/110, 137, 374/141, 142, 164, 166, 183; 364/557; 340/584, 585

[56] References Cited

U.S. PATENT DOCUMENTS

| | | | |
|---|---|---|---|
| 2,873,607 | 2/1959 | Van Kuyk | 374/110 |
| 2,975,629 | 3/1961 | Herbert | 374/166 |
| 4,130,019 | 12/1978 | Nitschke | 374/110 |
| 4,176,554 | 12/1979 | Kazmierowicz | 374/137 |
| 4,406,550 | 9/1983 | Gray | 374/110 |
| 4,455,095 | 6/1984 | Bleiker | 374/110 |
| 4,699,519 | 10/1987 | Persson | 374/166 |
| 4,901,061 | 2/1990 | Twerdochlib | 374/164 |
| 5,171,091 | 12/1992 | Kruger et al. | 374/166 |

*Primary Examiner*—G. Bradley Bennett
*Attorney, Agent, or Firm*—Walter B. Udell

[57] ABSTRACT

A mobile or transportable refrigerated container temperature monitoring system which includes digital monitoring and printout devices which provide accuracy and reliability, and means for periodically checking the monitoring means for operability and logging the results. An analog to digital converter is utilzed to convert analog temperature data obtained from thermistor sensors to digital form to provide digital data readout and to drive a digitally responsive printer. Sensing and control devices are provided to prevent printer jamming and compensate for widely varying temperature conditions. Automatically activated testing devices are provided which test and record the functionality of the thermistor temperature sensors by periodically applying a predetermined heat input to the thermistor temperature sensors and recording the responses including responses indicating errors, insuring reliability of the outputted recorded temperature data and pinpointing any improperly functioning sensors. A visual display is provided to indicate to the operator the state of the system. A microprocessor controller is utilized to receive temperature and other data and to control the printer and display. A keypad is provided for inputting desired data to the system via the microprocessor, such as start and finish transport dates and times, cargo, points of origin and destination, operator's identification, consignor and consignee, or any other pertinent information.

8 Claims, 13 Drawing Sheets

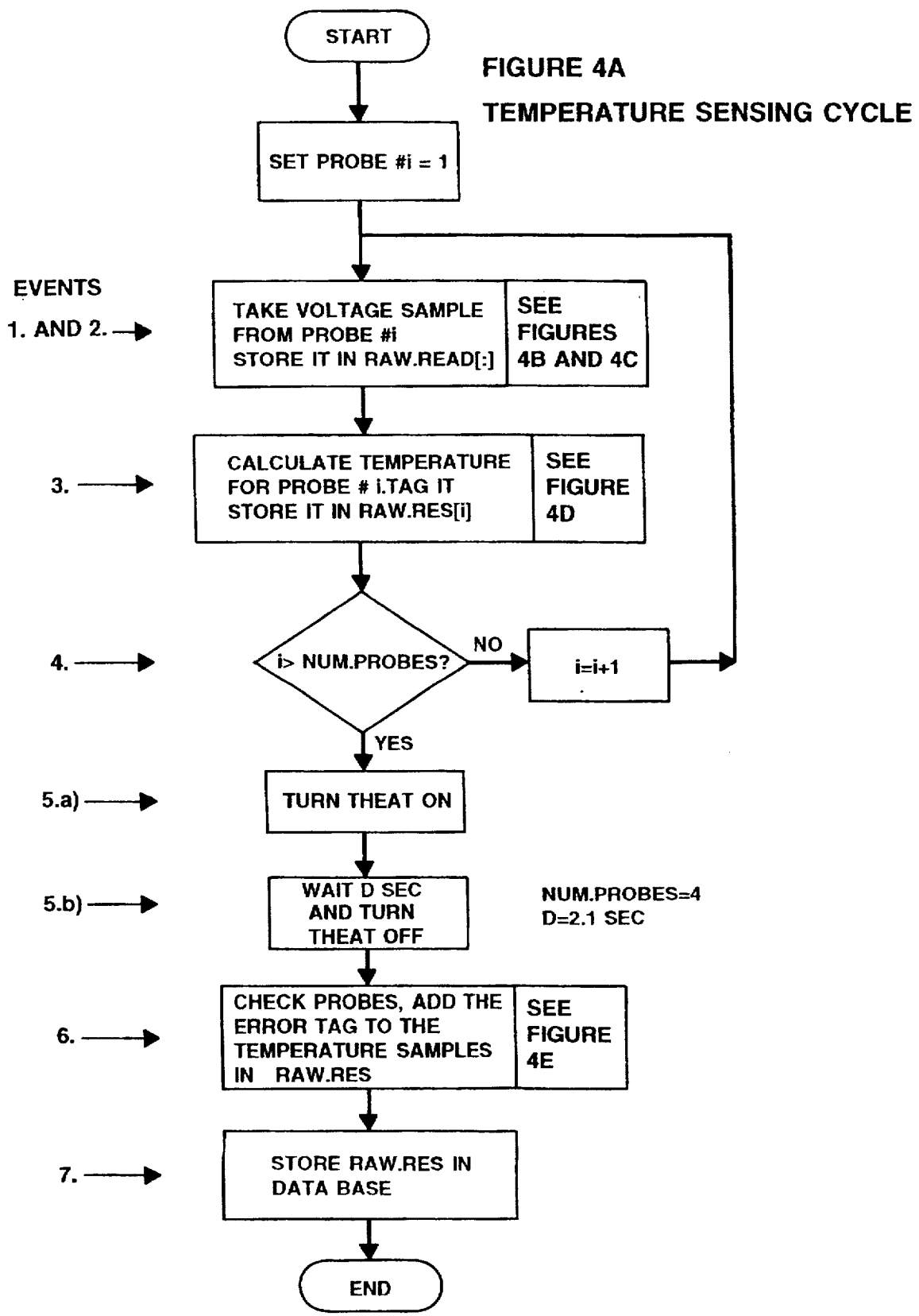

TAKE THE VOLTAGE SAMPLE FOR PROBE #i

AVERAGE

CALCULATE TEMPERATURE FOR PROBE #I

CHECK THE PROBES

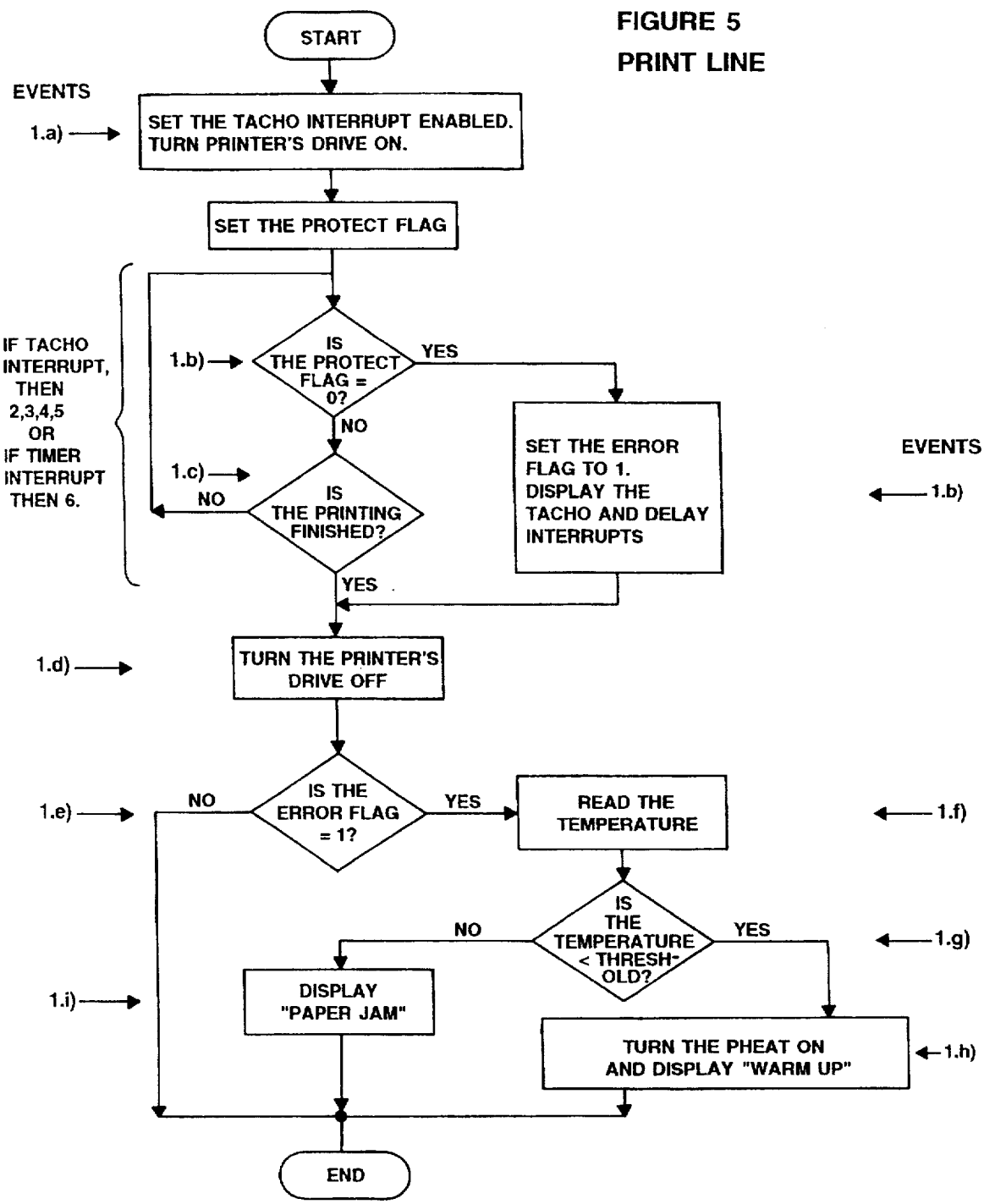

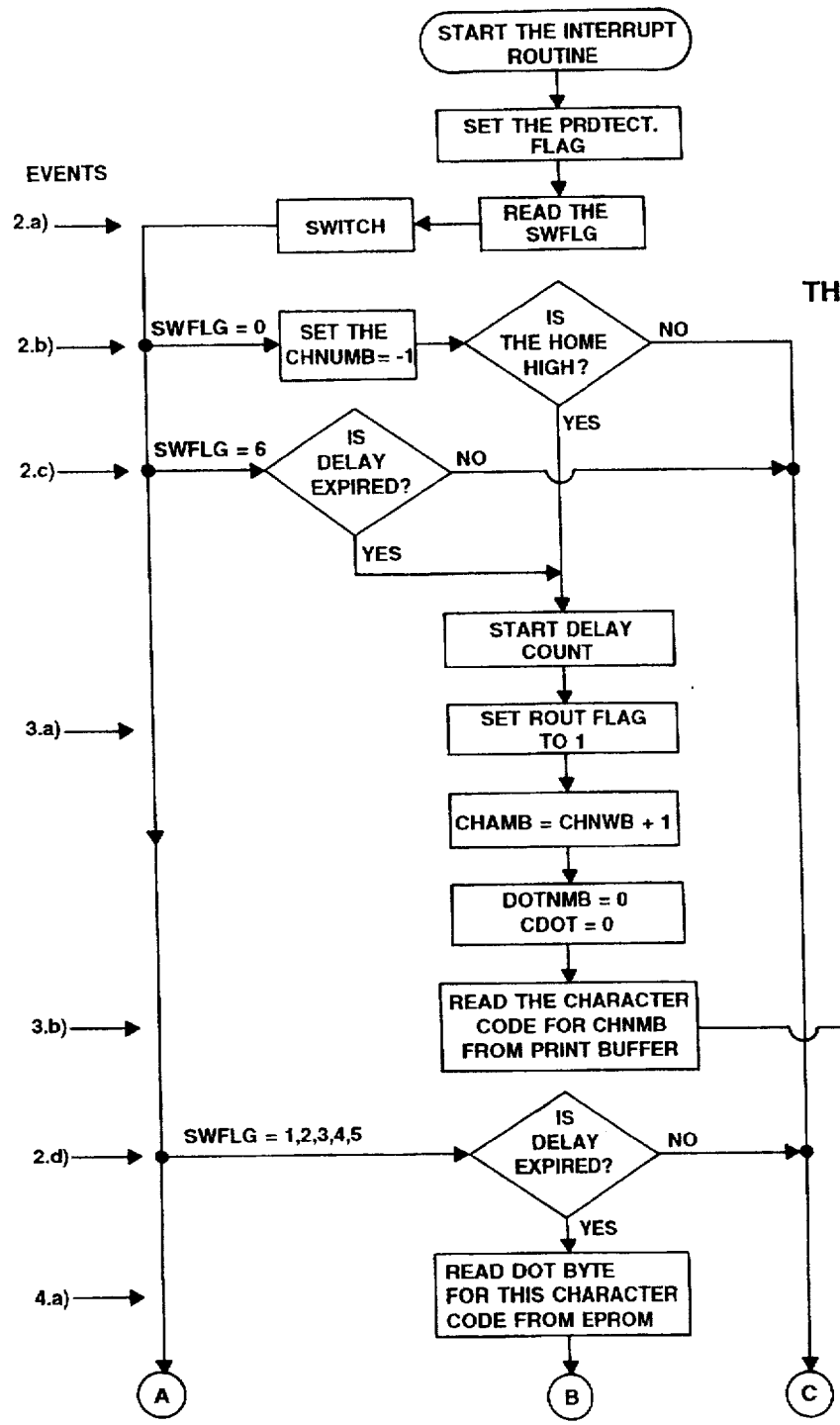
FIGURE 6A
FIGURE 6
THE TACHO INTERRUPT
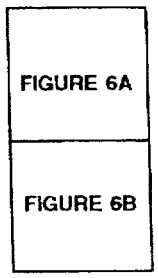

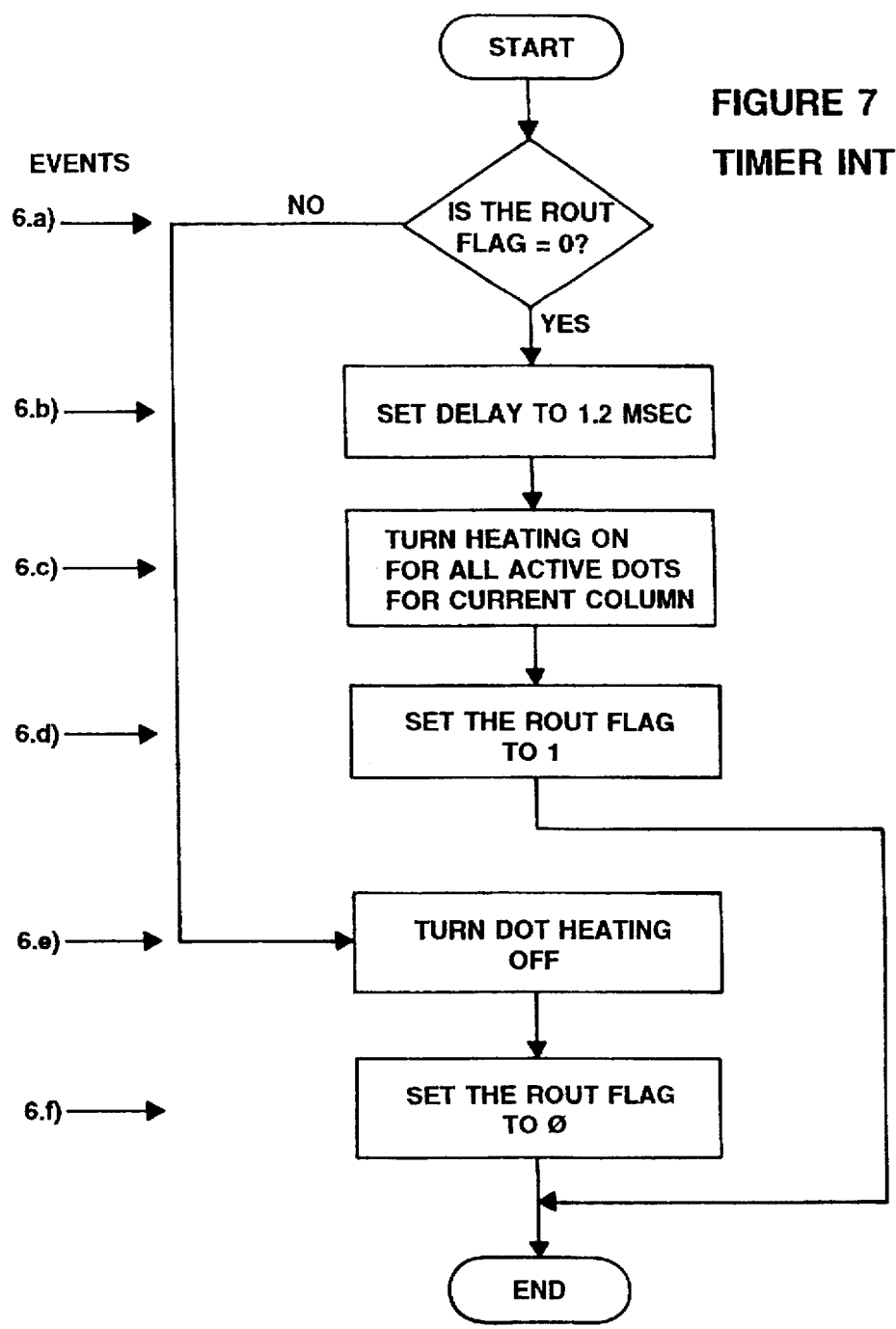

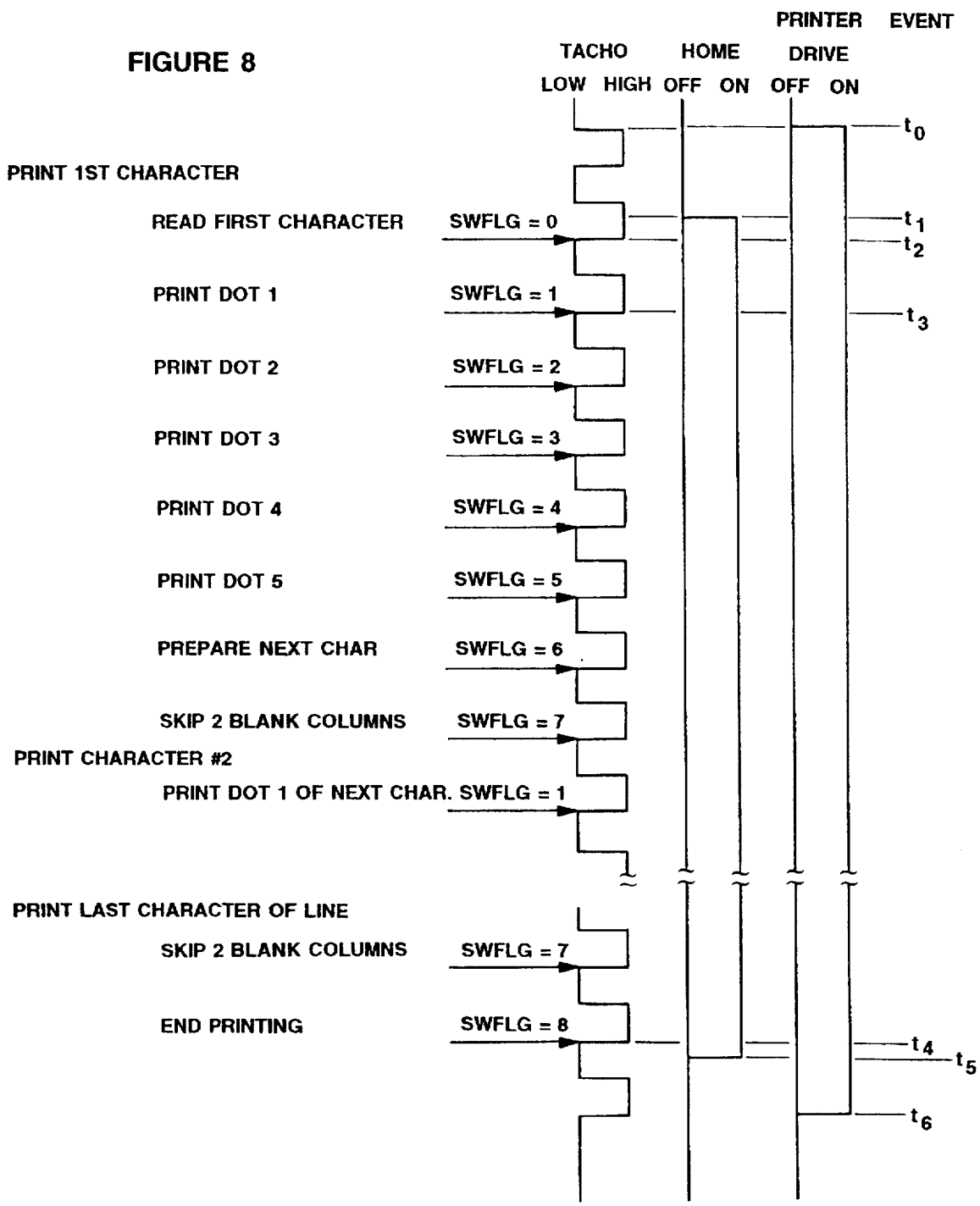

VEHICLE COMPARTMENT TEMPERATURE RECORDER

This invention relates to temperature recording systems for mobile closed containers, and more particularly relates to such systems for monitoring and recording the interior temperature of the load space of over-the-road refrigerated trucks or other mobile or transportable refrigerated containers carrying temperature sensitive goods such as fresh and frozen food.

BACKGROUND OF THE INVENTION

The presently available mobile or transportable refrigerated container temperature monitoring systems suffer from several major problems. The systems using digital monitoring devices can obtain a readout but not a printout, thereby providing no record of temperature fluctuations over the course of the trip, which may vary from hours to several days or longer. The systems that provide a printout use moving stylus analog printers which are not sufficiently accurate for present day requirements, and which have been unreliable as to serviceability in that they are subject to temperature variance, jamming, and freeze-up problems. Moreover, and equally serious, is that the present systems are incapable of demonstrating that the temperature sensing elements of the system are operative at all times, a fact that renders the accuracy of the monitoring systems highly suspect. This can be critical in cases where unknown uncontrolled temperature fluctuations can have serious consequences for the refrigerated cargo.

SUMMARY OF THE INVENTION

The system according to the invention overcomes these problems in several ways. First, an analog to digital converter is utilzed to convert analog temperature data obtained from thermistor sensors to digital form to provide digital data readout and to drive a digitally responsive printer, which eliminates the accuracy problem. Second, sensing and control devices are provided to prevent printer jamming and compensate for widely varying temperature conditions, which overcomes the reliability problems. Additionally, automatically activated testing devices are provided which test and record the functionality of the thermistor temperature sensors by periodically applying a predetermined heat input to the thermistor temperature sensors and recording the responses including responses indicating errors, thereby insuring reliability of the outputted recorded temperature data and pinpointing any improperly functioning sensor. A visual display is provided to indicate to the operator the state of the system. A microprocessor controller is utilized to receive temperature and other data and to control the printer and display. A keypad is provided for inputting desired data to the system via the microprocessor, which data might be by way of example only, start and finish transport dates and times, cargo, points of origin and destination, operator's identification, consignor and consignee, or any other pertinent information.

Accordingly, it is a primary object of the invention to provide a novel temperature sensing and recording system utilizing digital technology for accuracy.

Another object of the invention is to provide a novel temperature sensing and recording system as aforesaid which includes digital printing means and means for controlling the printer environment to prevent printer jamming and freeze-up.

A further object of the invention is to provide a novel temperature sensing and recording system as aforesaid which includes thermistor temperature sensors and means for testing and recording the proper or improper functioning of the temperature sensing thermistors.

The foregoing and other objects of the invention will appear more fully hereinafter from a reading of the following description and an examination of the appended drawings, wherein:

FIGS. 4A through 4E are an algorithmic diagram of the program for one complete cycle of the temperature sensing process, wherein;

FIG. 4A shows the complete cycle program;

FIG. 4B is an expanded algorithmic diagram of that part of the complete program directed to taking a voltage sample, which is shown as a single block in the diagram of FIG. 4A;

FIG. 4C is an expanded algorithmic diagram of that part of the program for taking a voltage sample which is directed to calculating an average voltage sample, which is shown as a single block in the diagram of FIG. 4B;

FIG. 4D is an algorithmic diagram of that part of the complete program which is directed to calculating a probe temperature, which is shown as a single block in the diagram of FIG. 4A;

FIG. 4E is an algorithmic diagram of that part of the complete program which is directed to checking the probes operability and adding error codes, which is shown as a single block in the diagram of FIG. 4A;

FIG. 5 is an algorithmic diagram of the overall program for printing;

Figure 6B:
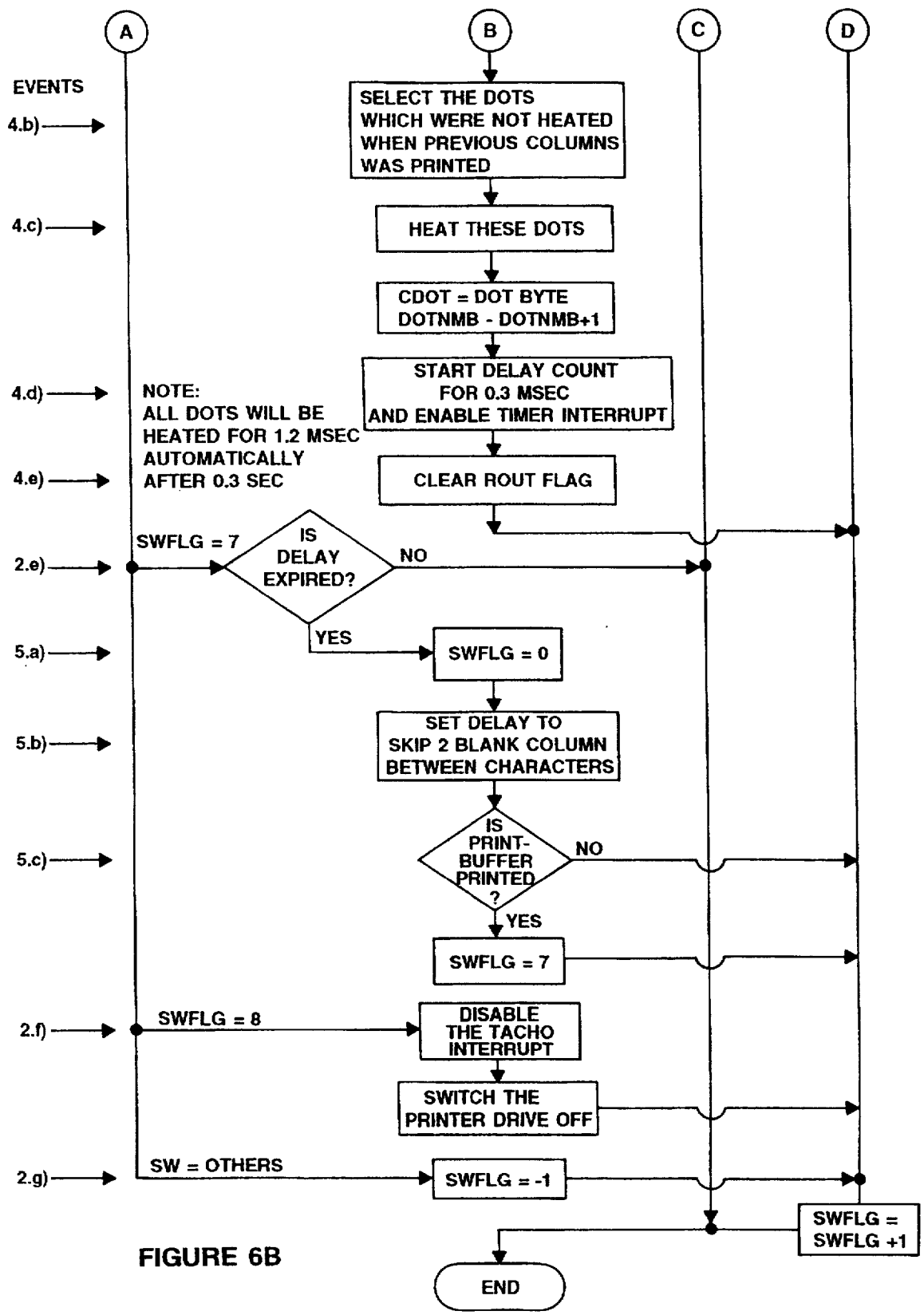

FIG. 6, consisting of FIGS. 6A and 6B, is an algorithmic diagram of the TACHO INTERRUPT sequence of the printing cycle of FIG. 5.

FIG. 7 is an algorithmic diagram of the TIMER INTERRUPT sequence of the printing cycle of FIG. 5; and FIG. 8 is a timing signals diagram for printing one line.

GENERAL DESCRIPTION OF THE SYSTEM

Figure 1:
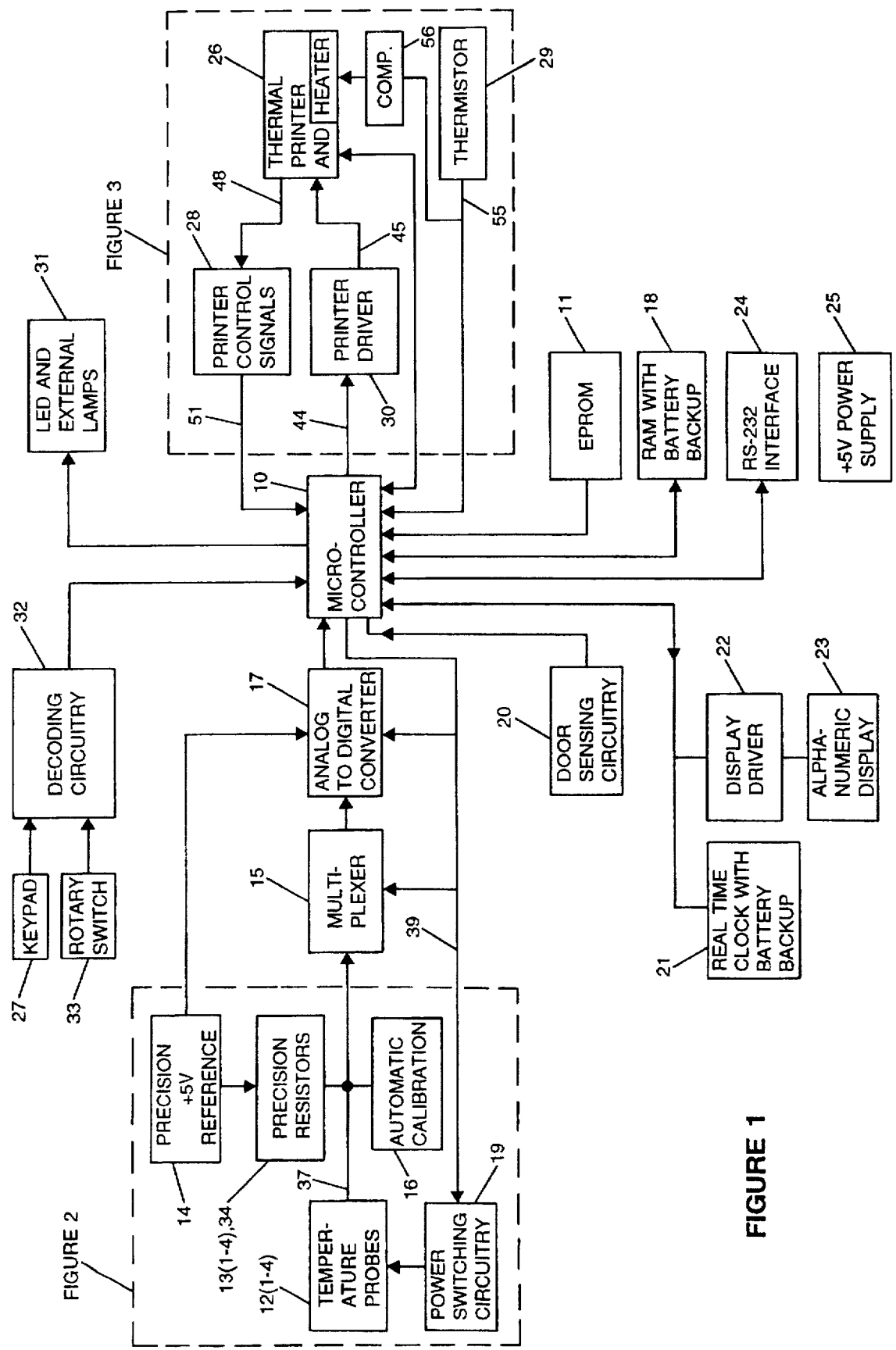
FIG. 1 is a functional block diagram of the temperature sensing and recording system according to the invention.

The functional block diagram of FIG. 1 illustrates the vehicle compartment temperature recorder according to the invention which measures at predetermined time intervals the temperatures of a plurality of probes in the compartment, stores these temperatures, and provides a printed record of them. The central control for the device is a microcontroller 10, typically a Phillips P80CL580, which controls all of the peripheral components in accordance with the program stored in the Eprom 11.

The temperature is measured by comparing the voltage measured at a point in a voltage divider between each of the thermistor temperature probes 12(1–4) and an associated precision resistor 13(1–4) to a generated table of voltage versus temperature. The voltage divider and supporting circuitry are supplied by a precision voltage reference 14 to reduce errors due to voltage tolerance and temperature changes. The resultant voltage from the voltage divider is routed to an analog multiplexer 15, which typically could be a 74HC4051. This multiplexer, under control of the microcontroller 10, connects a selected one of the four external probes 12(1–4) or the calibration circuit 16 to the A/D converter 17, which typically could be a LTC1286, where the signal is digitized and then compared to the voltage reference table by the microcontroller 10 and the resultant digital signal is transferred to RAM.

RAM 18 is used to store pertinent information about the user, system limits, and the temperature data. It is powered by a 3 volt backup lithium battery when the 5 volt power supply 25 is not active in order to retain temperature information for a period of 5 years.

Before taking temperature data samples for each probe on each cycle, an automatic calibration is performed to determine whether there are voltage offsets in the system which may produce erroneous readings. If such exists, the microcontroller adjusts the sample then taken to correct for the offset before sending the data to RAM 18. Six successive samples are taken for each probe, the highest and lowest values are removed, and the remaining four samples are averaged to determine the temperature value that is then stored in RAM 18. The temperature probe thermistors are ±0.1 degrees C interchangeable and are each located in the end of separate stainless steel probe housings.

The thermistors are checked after each temperature cycle of the temperature probes, which illustratively may be four in number, to check whether or not they are working properly. The power switching circuitry 19 heats a resistor which is located next to the thermistor inside each probe housing to change the probe's resistance. A temperature data sample that is obtained before the heating is compared with the temperature test sample taken after the heating. If the change in temperature is greater than a pre-determined limit the probe is identified as a properly functioning probe, and the temperature data sample previously stored in RAM from this probe is considered accurate. If the probe is determined not to be properly functioning, then the temperature data sample previously stored in RAM 18 from this probe is tagged with a signal generated by the microcontroller 10. Subsequently, when the temperature data is printed out any temperature samples with signal tags are indicated as being erroneous.

The thermal printer 26 prints, on command from the keypad 27, alarm reports and complete temperature reports, as for example, most recent temperature samples, selected previous temperature samples, or all accumulated data. The thermal printer may be located inside or outside of the compartment. Circuitry 28 receives Home and Tachometer signals from the printer 26 and conditions them to be used by the microcontroller 10 for printer timing and control functions. A thermistor 29 is used to sense the ambient temperature of the printer 26 to turn the printer heater on when the temperature is less than 1 degree Centigrade.

The AC tachometer signal is generated by movement of the printer head and is constantly monitored by the microcontroller 10. This AC signal is conditioned by the circuitry 28 into a square wave which the microcontroller 10 uses to control printing. If this signal is not seen when it is expected, the microcontroller decides that the printhead must be jammed and turns off all of the power to the printer 26 through the printer driver 30 to avoid damaging any components. The Home signal is a step signal from the printer 26 and is generated each time the print head returns to the start position for a new line.

The microcontroller 10 interfaces with the real time clock 21 and the liquid crystal display driver 22, and drives several LED's and external lamps 31 which indicate alarm conditions, such as out of tolerance temperature conditions and nonfunctioning temperature probe s. The clock governs the times of occurrence of all real time actions displayed on a printout. The LCD driver controls the liquid crystal display 23 which displays temperature samples, keypad input, and various other desired functions of the apparatus. Decoders and associated circuitry 32 are used to convert signals from a rotary switch 33 and standard telephone keypad 27 to signals usable by the microcontroller. An RS-232 interface 24 is available for downloading temperature information to a computer. Door sensing circuitry 20 detects the opening of different doors in the compartment and produces a time logged record of such occurrences.

The entire apparatus, except for the temperature sensing probes, is contained in a housing mounted outside of the temperature controlled compartment.

Detailed Operations

The front panel power switch is turned ON and the microcontroller 10 begins to read the program from the Eprom 11, carrying out the following:

A green lamp in the external lamp display 31 will turn on if the unit is connected to an external power source.

sets the decoding circuitry 32 for necessary initial conditions for the keypad 27 and rotary switch 33, and scans the rotary switch to determine which position it is in.

clears the alpha numeric LCD display 23 and reads time from the RTC 21 to update the microcontroller 10 internal clock. The display 23 shows a predetermined word corresponding to the position of the rotary switch.

The unit is programmed to normally wait a predetermined start-up time, such as five minutes, and to then start taking temperature samples at programmable pre-set intervals, for example of 15 or 30 minutes. Data relevant to the particular session about to start is entered in the unit by moving the rotary switch 33 to the desired position and using the keypad L27 to enter the data during a disabled mode, which is settable by a particular position of the rotary switch and keypad stroke. These data are received by the microcontroller 10 and entered in RAM 18 and also displayed to the user on the LCD display 23.

Temperature Data Readings and Operability Check of Thermistor Probes

Figure 2:
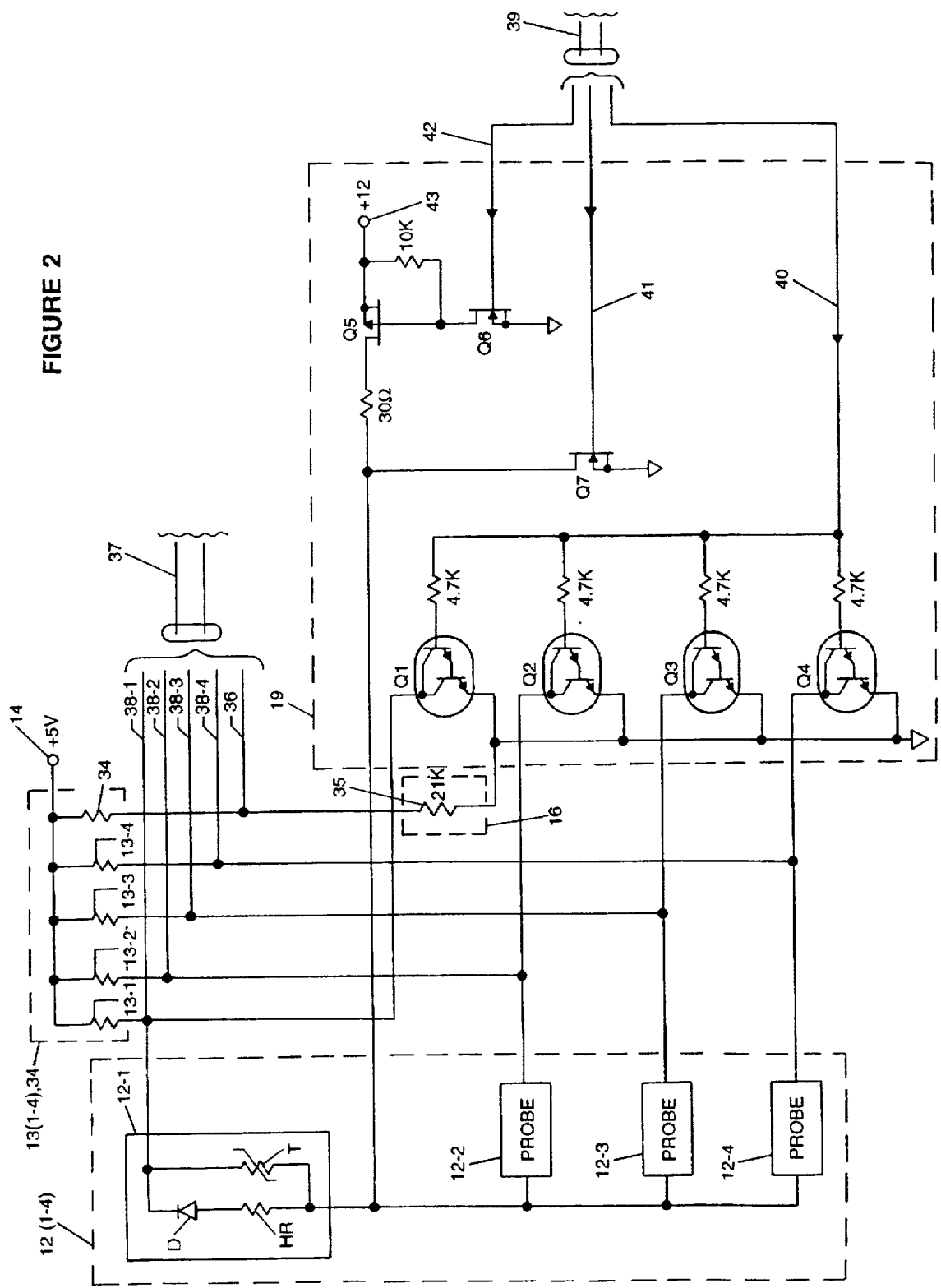
FIG. 2 is a schematic diagram of the thermistors temperature sensing and operational verifying switching circuitry.

The circuitry for carrying out these specific functions is shown in FIG. 2, to which reference should now be made.

In normal temperature sensing operations for acquiring temperature readings data in the temperature controlled compartment the thermistor heating transistors Q1, Q2, Q3, Q4, Q5, and Q6 are OFF, and transistor Q7, the thermistor ground, is ON, so that one end of each temperature sensing probe 12(1–4) is grounded. The probes are respectively shown in series with precision resistors 13(1–4) and connected between a precision source of positive voltage 14 and the Q7 thermistor ground. Current from positive voltage source 14 is blocked from flowing through the thermistor heating resistor HR by diode D. The junctions of the thermistors and precision resistors are respectively connected to the multiplexer through cable 37 by the signal lines 38(1–4). Samples are taken of the monitored temperatures on all four probes by the multiplexer 15 and A/D converter 17 under control of the microcontroller 10 and the results are stored in RAM 18, as previously described in the general description of FIG. 1.

To accomplish the operability check of the thermistors in the probe the following steps are performed. Prior to taking each set of six operability checking temperature readings, a set of six calibration readings is taken for each probe 12(1–4), and as for the probe data readings, the high and low readings are discarded, the four intermediate readings are averaged, and a correction term is calculated by the microcontroller 10 and applied to the resultant temperature sample before the latter is stored in RAM 18. The calibration voltage appears at the junction between precision resistor 34 and calibration resistor 35 on signal line 36, and is routed to the microcontroller 10 via cable 37 through the multiplexer 15 and A/D converter 17 under control of the microcontroller, where the correction is applied to the temperature sample.

Transistors Q1, Q2, Q3, and Q4 are turned ON by a microcontroller signal over signal line 40 of cable 39 to provide a ground on the signal lines 38-1 through 38-4 for heating current to pass from 12 volt power source 43 through the heating resistor HR and diode D associated with each probe assembly to heat the adjacent associated thermistor T when transistor Q5 is turned ON. Transistor Q7, the thermistor ground, is turned OFF by an appropriate signal from the microcontroller through signal line 41 of cable 39 to prevent the heating voltage from 12 volt source 43 from shorting to ground. Transistor Q6, the thermistor heating control, is turned ON by a microcontroller signal over signal line 42 of cable 39, which turns ON transistor Q5, the thermistor heating pass transistor, which passes current from the 12 volt source 43 to heat the heating resistor HR in the probe for a predetermined time. All four channels are heated simultaneously.

Next, transistor Q6, the thermistor heating control, is turned OFF, which turns OFF transistor Q5, the thermistor heating current pass transistor, and disconnects the +12 volt power source 43 from the probes 12(1–4). The thermistor ground Q7 is turned ON to reestablish the probes ground. The Q1, Q2, Q3, and Q4 thermistor heating grounds are turned OFF, thereby lifting the grounds from the cable 37 connections to the probes 12(1–4).

A sample of the temperatures on all four heated probes is performed and processed. The probes thermistors data temperature readings are compared with the readings from the thermistors heating test. If the difference in temperatures for each probe is greater than a predetermined amount, for example three (3) degrees Centigrade, the thermistor is indicated as functioning properly. If the change in temperature is not greater than three (3) degrees Centigrade for a particular probe, it is not working properly, and the data in RAM 18 from that probe is coded by the microcontroller 10 to designate an Error.

Components for the implementation of FIG. 2 could typically be the following.

| Q1–Q4 | MPSA13 | |
|---|---|---|
| Q5 | Supertex VP2206 | |
| Q6, Q7 | Supertex VN2206 | |
| T | U.S. Sensor Part No. AT103J10-.1C | |
| D | 1N459A | |
| HR | 5% carbon | |
| 13(1–4), 34 | IRC Part No. 4761-03-3922BA | 39.2K ± 0.1% |
| 35 | IRC Part No. RC55V-21K0-A | 21K ± 0.05% −55 C. to +155 C. |

After all of the pertinent data is entered and the rotary switch is rotated to SAMPLE position, the unit is enabled with a keypad keystroke to begin sampling temperatures at the desired intervals. Enabling the unit starts the following chain of events which are shown in algorithmic form in FIGS. 4A through 4E and correlated in these Figures to the algorithm.

1.a) microcontroller 10 instructs the multiplexer 15 to read the calibration voltage at calibration resistor 35 on line 36 of cable 37.

b) microcontroller 10 then instructs the A/D converter 17 to begin sampling the voltage and then to serially transfer the results to the microcontroller.

c) This process (b) is done 6 times.

d) microcontroller 10 removes the highest and lowest values and averages the remaining four.

e) microcontroller 10 calculates a correction term and stores it in RAM 18 where it is used to offset the external probe readings due to offset errors in the internal circuitry and errors due to temperature changes.

2.a) microcontroller 10 then switches the multiplexer 15 to read thermistor probe 1 b) microcontroller 10 instructs the A/D converter 17 to begin sampling the voltage and to serially transfer the result to microcontroller 10 where a correction term is applied and the result temporarily stored.

c) This process (b) is done 6 times.

d) microcontroller 10 removes the highest and the lowest values and averages the remaining four.

e) This result is stored by microcontroller 10 in (6) as the temperature reading of thermistor probe 1 at that time.

3. microcontroller 10 calculates the temperature for probe Ti from the voltage sample and stores it in RAM 18.

4. Steps 1, 2, and 3 are repeated for the other 3 probes. (Repeats B, C, and D)

5.a) microcontroller 10 instructs the power switching circuitry to change the voltage polarity across the probes and heat the resistors HR to heat the thermistors.

b) microcontroller 10 instructs the power switching circuitry to return the voltage polarity across the probes to the sensing condition.

6.a) microcontroller 10 then takes the voltage sample for probe 1 as in steps 1. and 2.

b) microcontroller 10 reads the previously stored voltage sample from RAM 18 for probe 1 before heating the probe.

c) If the result is higher in temperature by some predetermined limit than the result in step 2e) the probe is determined to be in proper working order.

d) If the probe is determined not to be in proper working order microcontroller 10 records the temperature reading in RAM 18 with an error flag which is printed out on the report and transferred to an external device when the RS-232 interface 24 is used.

e) Steps 6a, 6b, 6c, and 6d are then repeated for the remaining 3 probes.

7. microcontroller 10 stores the results in RAM 18.

The program steps for each of FIGS. 4A through 4E are as follows:

---

FIG. 4A 1. i = 1 ( i is the probe number)
2. RAW_READ[i] = VOLTAGE_SAMPLE(i)
3. RAW_RES[I] = TEMPERATURE(RAW_READ[i])
4. IF I ≤ NUM_PROBES        (I.E. NUM.PROBES = 4)
   { 1 = i + 1
     GOTO(2)
   }
5. THEAT = ON
6. WAIT (D);                 (I.E. D=2.1 SEC)
7. THEAT = OFF
8. CHECK_PROBES( )
9. DATA_BASE = RAW_RES.

-continued

Figure 4B:
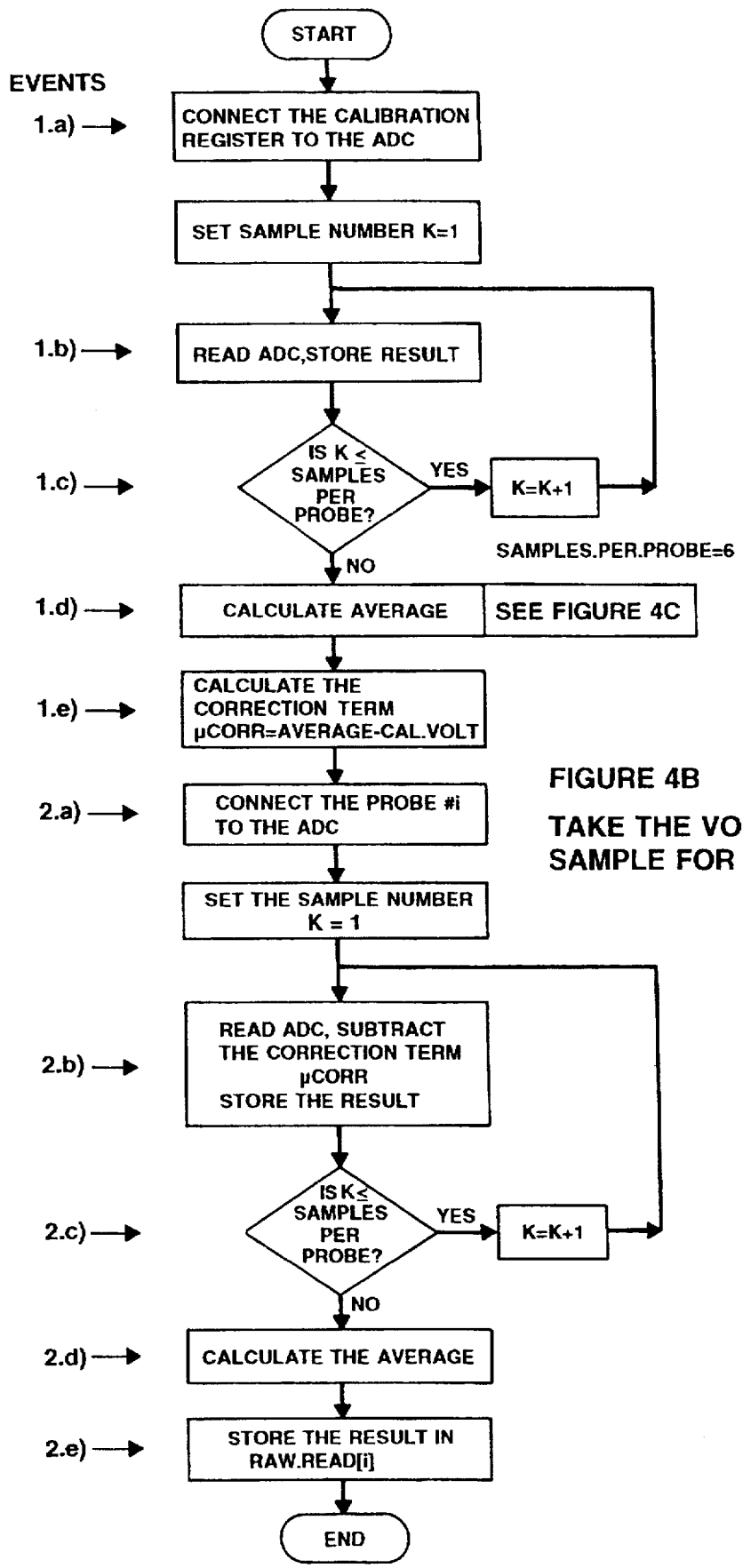
Figure 4C:
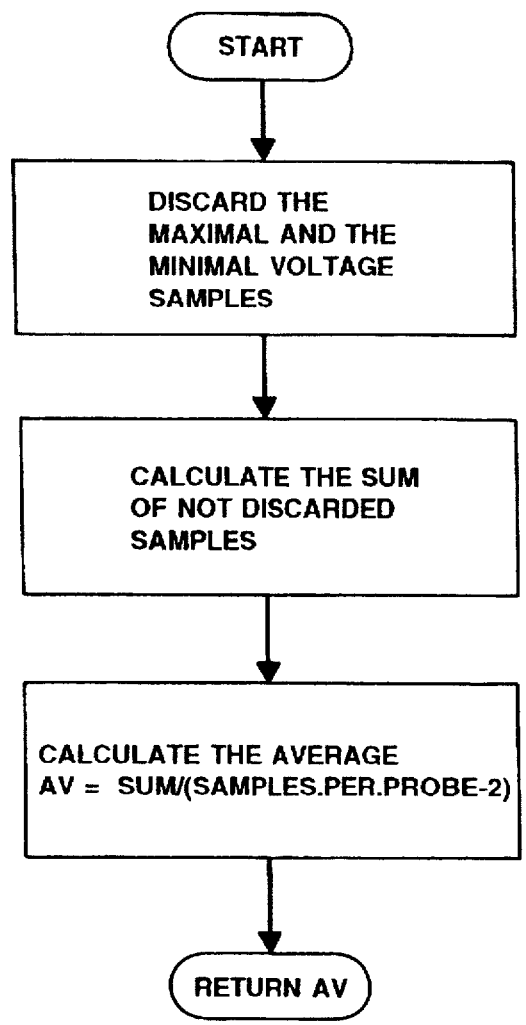
Figure 4D:
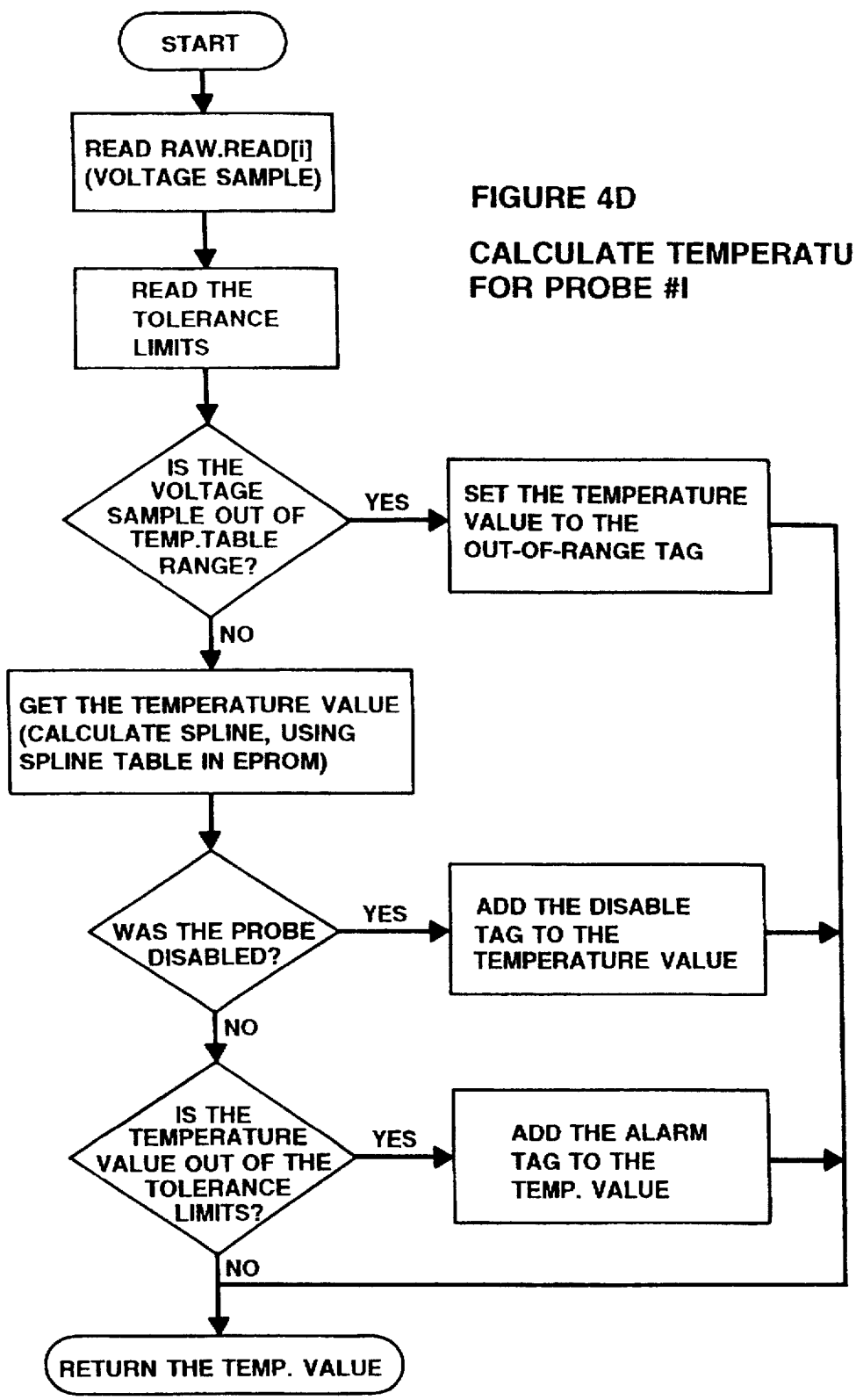
Figure 4E:
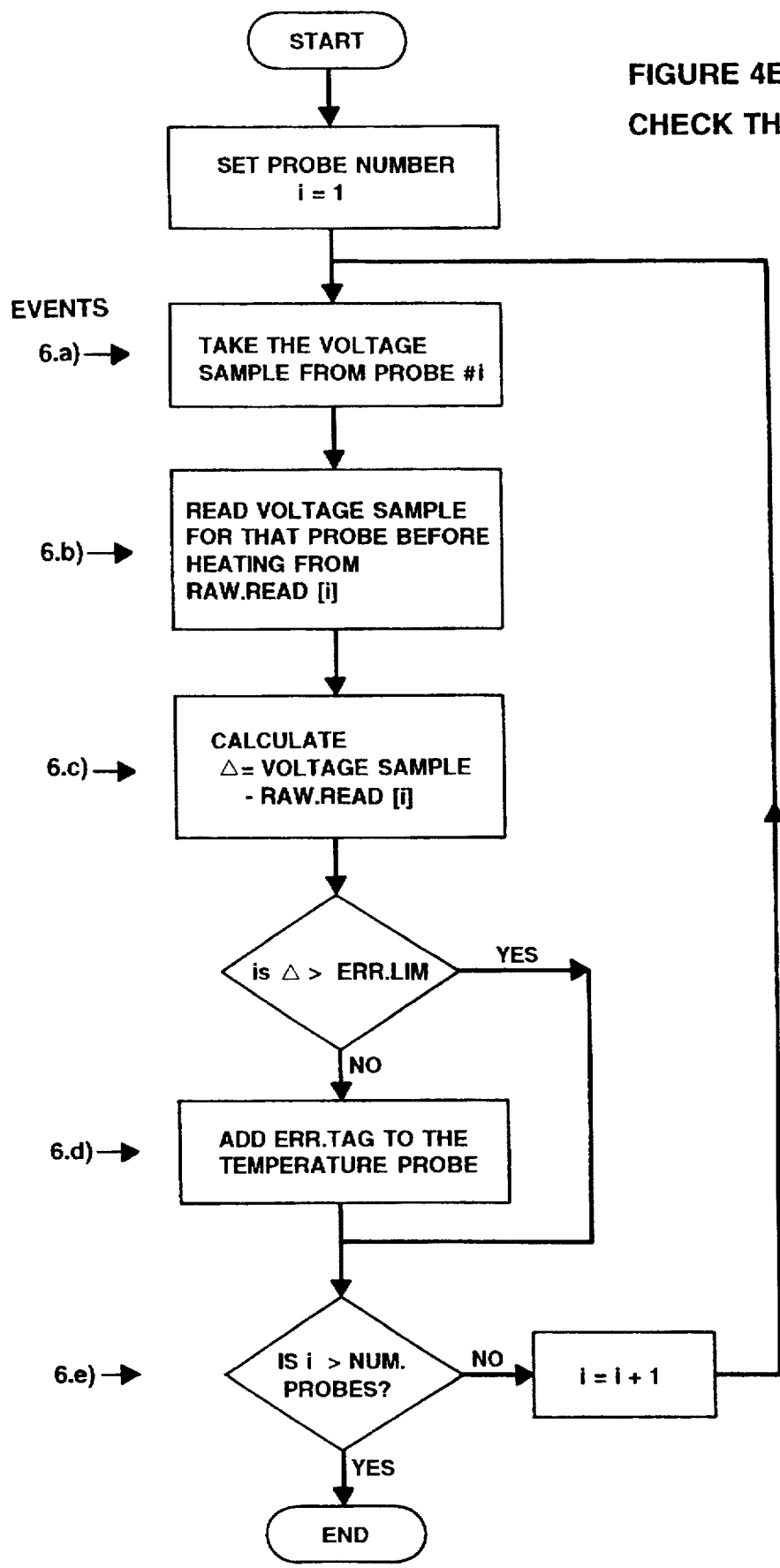

FIGS. 4B and 4C

VOLTAGE_SAMPLE (K)
1. SET THE MULTIPLEXER CHANNEL 'R' ON (CONNECT THE CALIBRATION RESISTOR TO THE ADC) (I.E. 'R' = 5) CALIBRATION RESISTOR TO THE ADC) (I.E. 'R' = 5)
2. i = 1  ( i IS THE SAMPLE NUMBER)
3. READ THE ADC. TEMPORARILY STORE THE RESULT.
4. IF (i ≦ SAMPLES_PER_PROBE)
   {   i = i + 1
       GOTO (3)     (I.E. SAMPLES_PER_PROBE = 6)
   }
5. DISCARD THE GREATEST AND THE LOWEST READINGS.
6. AVERAGE THE NOT DISCARDED READINGS
   AV = Σ READINGS/(SAMPLES_PER_PROBE-2)
7. nCORR = AV − CAL_READING   (DEF: nCORR=> CORRECTION TERM, CAL_READINGS=> PREDETERMINED VALUE OF THE VOLTAGE)
8. SET THE MULTIPLEXER CHANNEL #K ON (CONNECT THE PROBE #K TO THE ADC)
9. READ THE ADC; SUBTRACT 'nCORR'; STORE ADC_READING
10. IF (i ≦ SAMPLES_PER_PROBE)
    {   i = i + 1
        GOTO (9)
    }
11. REPEAT STEPS (5) . . . (6) TO GET AVERAGE OF VOLTAGE READINGS FOR PROBE #K.
12. STORE THE AVERAGE IN RAW_READ[K].

FIG. 4D

CALCULATE_TEMPERATURE (RAW.READ[i])
1. READ RAW_READ[I] FROM MEMORY  (GET THE VOLTAGE SAMPLE)
2. READ TLOW[i], THIGH[i]   (GET THE TOLERANCE LIMITS)
3. IF (RAW.READ[i] > ADC_HIGH_RANGE)
   {   TEMPERATURE = OUT_OF_HIGH_RANGE_TAG
       RETURN TEMPERATURE
   }
   ELSE GOTO (4)
4. IF (RAW_READ[i]<ADC_LOW_RANGE)
       RETURN TEMPERATURE
   }  ELSEGOTO(5)
5. CALCULATE THE SPLINE TO GET THE TEMPERATURE FOR RAW_READ[i], USING SPLINE TABLE IN EPROM.
6. IF (TLOW[i] ≧ DISABLED_CONST)
   {   TEMPERATURE = TEMPERATURE + DISABLED_TAG
       RETURN TEMPERATURE
   }
   ELSE GOTO (7)
7. IF (TEMPERATURE < TLOW[i])
   TEMPERATURE = TEMPERATURE + LOW_ALARM_TAG
   ELSE IF (TEMPERATURE > THIGH[i])
   TEMPERATURE = TEMPERATURE + HIGH_ALARM_TAG
   RETURN TEMPERATURE

FIG. 4E

CHECK_THE_PROBES
1. i = 1   (SET THE PROBE # i= 1)
2. HEAT_VOLTAGE = VOLTAGE_SAMPLE( I )
3. READ RAW_READ[i] FROM MEMORY  (GET THE VOLTAGE READING FOR PROBE #i BEFORE HEATING)
4. Δ = HEAT_VOLTAGE − RAW_READ[i]
5. IF (Δ < ERR_LIM)
   {   REMOVE ALL TAGS FROM RAW_RES[i] (STRIP ALL TAGS FROM THE TEMPERATURE VALUE)
       TEMPERATURE = TEMPERATURE + ERR_TAG
       RAW_RES[i] = TEMPERATURE
6. IF ( i ≦ NUM_PROBES)
   {   i = i + 1
       GOTO (2)
   }

Printing, Printer Heating, and Printer Jam Power Shutdown

Figure 3:
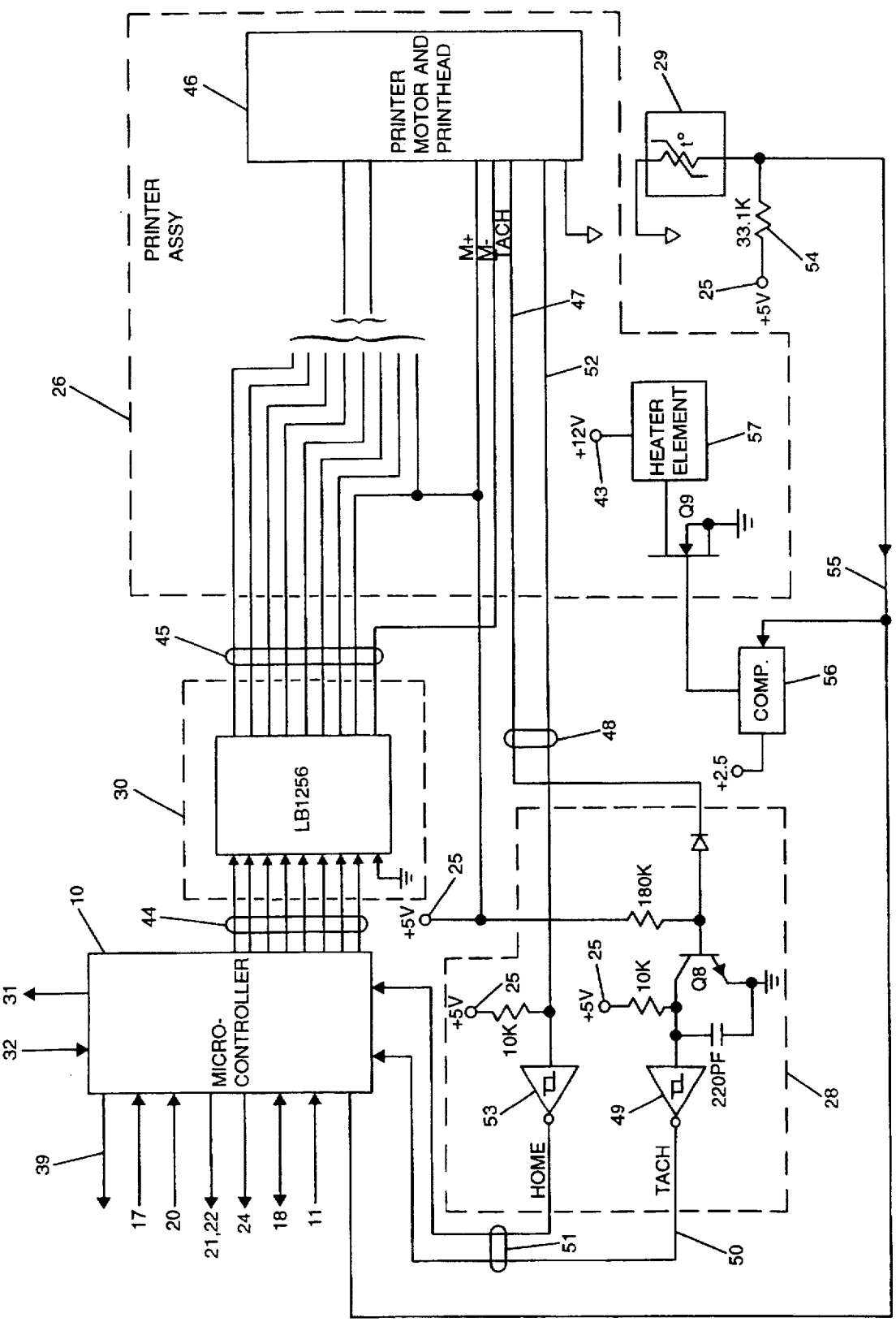
FIG. 3 is a schematic diagram of the control circuitry for the digital thermal printer operation.

The circuitry for carrying out these specific functions is shown in FIG. 3, to which reference should now be made.

To obtain a printout the user must rotate the function control rotary switch 33 to the Print position and depress the specific button of the keypad 27 that corresponds to the desired type of printout. First, the microcontroller 10 applies power through cable 44 and the LB1256 IC printer driver 30 via cable 45 to the printer motor and thermal print head 46 to allow the head to move. Then, the microcontroller 10 begins to read the stored temperature information from the RAM 18 and sends it to the printer driver 30. From the printer driver 30 the information goes directly to the printhead 46 via cable 45.

The printhead 46 consists of 7 individual vertically arranged dots in a straight column from top to bottom. Every 4 milliseconds the printhead moves to the next dot column position. After the printhead has moved for printing to five adjacent columnar positions a single letter is completed, a letter being defined as a matrix of 7 dots high by 5 dots across. As the printhead 46 moves across the paper it generates a 4 millisecond sine wave called the tachometer or TACH signal. This signal appears on signal line 47 of cable 48, is conditioned by the transistor Q8 and Schmitt trigger 49 circuitry into a 4 millisecond square wave, and is routed to the microcontroller 10 over signal line 50 of cable 51. The microcontroller 10 uses this TACH signal to begin printing the next letter segment. When the TACH print signal goes low the microcontroller 10 energizes the appropriate printer head dots for either 1.2 or 1.5 milliseconds, depending on whether or not the dot had been heated on the previous letter segment. If a TACH signal transition is not seen during a predetermined time inteval, the microcontroller 10 assumes the occurrence of a printer jam and turns off power to the printer.

After the entire line has been printed the printer motor 46 automatically returns the printhead to the leftmost position, called the home position, where it depresses a switch which generates a signal on line 52 of cable 48, passing through Schmitt trigger inverter 53 as the HOME signal and signalling microcontroller 10 that the printer head is in its home position. The microcontroller 10 uses this HOME signal to begin printing the next line of data. After all of the data has been printed, the microcontroller 10 turns the printer motor 46 off the next time that it returns to the home position.

The thermistor 29 monitors the temperature of printer 46 and causes a voltage indicative of such temperature to appear at its junction with 33.1K precision resistor 54, which voltage is sensed by microcontroller 10 and comparator 56 over signal line 55. This voltage is compared to a reference voltage by the comparator, and if it is higher than the reference voltage causes the comparator to turn on transistor Q9 which turns on the printer heater 57 located under the printer 46. If during a printing cycle a printer jam is indicated by loss of the TACH signal, the microcontroller 10 samples the voltage on line 55 and compares it to a voltage vs. temperature table. If the indicated temperature is less than 1 degree Centigrade, the microcontroller 10 displays WARM UP on the LCD display 23, if more than 1 degree Centigrade the microcontroller displays PAPER JAM on the display 23.

Components for the implementation of FIG. 3 could typically be the following.

| | |
|---|---|
| LB 1256 | Sanyo |
| 29 | U.S. Sensor Part No. KC103J2K |
| 46 | Seiko MTP201-24-B |
| 49, 53 | 74HC14 |
| 56 | LM2903 |
| 57 | 22.8 ohms/34.4 watts @ 28 volts |
| Q9 | Supertex VN2206 |
| Q8 | 2SC1740R |

Depressing a key of keypad 27 to obtain the desired printout causes the following sequence of events, which are shown in algorithmic form in FIGS. 5, 6, and 7, and which are correlated in these Figures to the algorithm.

1.a) Microcontroller 10 sets the TACHO Interrupt enabled and turns the printer motor drive of driver 30 ON.

b) Microcontroller 10 checks the tachometer signal which is generated by the movement of the printhead 46. If the signal is seen by the microcontroller on line 50 within a predetermined amount of time an internal flag is not set. If the signal is not seen within a predetermined amount of time an internal flag is set and several software interrupts are disabled.

c) Microcontroller 10 determines whether or not the printing of the line is finished.

d) Microcontroller 10 turns OFF any of the printhead thermal printing dots and turns OFF the printer motor drive 30.

e) Microcontroller 10 checks the internal error flag to see if it was set in step 1b.

f) Microcontroller 10 reads the voltage on line 55 at the junction of the printer thermistor 29 and precision resistor 54, and compares it to a voltage versus temperature table to determine the corresponding temperature.

g) Microcontroller 10 compares the temperature found in step 1.f) to the predetermined limit of 1 degree Centigrade.

h) If the temperature is determined to be less than 1 degree Centigrade, microcontroller 10 turns on the printer heater 57 and displays WARM UP on the LCD 23.

i) If the temperature is determined to be greater than 1 degree Centigrade, microcontroller 10 displays on the LCD 23 "PAPER JAM".

The TACHO INTERRUPT 2.a) Microcontroller 10 reads a specific register in its memory called "SwFlg" and makes decisions based on that number. Valid numbers for this application are 0, 1, 2, 3, 4, 5, 6, 7, 8, and 9.

b) If SwFlg=0, then microcontroller 10 checks printer control signals 28 to see if the HOME signal is at the appropriate voltage level. The HOME switch is located at the leftmost position of the printhead 46. When the printhead is at the home position it depresses the HOME switch which signals the microcontroller 10 via the HOME signal that it is at its home position. If it is not at the correct voltage level then microcontroller 10 decides to exit part 2. If it is at the correct voltage level then microcontroller 10 decides to goto part 3.

c) If SwFlg=6, then microcontroller 10 checks to see if a predetermined delay time, which was previously set by microcontroller 10, has expired. If it has not expired microcontroller 10 decides to exit part 2. If it has expired then microcontroller 10 decides to goto part 3. p1 d) If SwFlg=1, 2, 3, 4, or 5, then microcontroller 10 checks to see if a predetermined delay time, which was previously set by microcontroller 10, has expired. If it has not expired microcontroller 10 decides to exit part 2. If it has expired then microcontroller 10 decides to goto part 4.

e) If SwFig=7, then microcontroller 10 checks to see if a predetermined delay time, which was previously set by microcontroller 10, has expired. If it has not expired microcontroller 10 decides to exit part 2. If it has expired then microcontroller 10 decides to goto part 5.

f) If SwFlg=8, then microcontroller 10 disables the TACHO interrupt, switches the printer dot heating drive OFF, and then exits part 2.

g) If SwFlg=any other number, SwFlg is set to equal −1 and then microcontroller 10 exits part 2.

3.a) Microcontroller 10 sets the internal flag ROUT to equal 1.

b) Microcontroller 10 begins to read the stored temperature information from the RAM 18 and stores it in a buffer in the microcontroller internal memory.

4.a) Microcontroller 10 reads a character from its internal buffer and compares it to a character chart in Eprom 11. Microcontroller 10 selects the appropriate dots to be printed for the appropriate column it is printing. A single letter is defined as a matrix of 7 dots high by 5 dots across.

b) Microcontroller 10 selects the dots that were not heated during the previous columns printing.

c) Microcontroller 10 transfers the correct dot heating information to printer driver 30 and the dots begin to heat the paper.

d) Microcontroller 10 starts a 0.3 millisecond delay and enables the TIMER INTERRUPIT. Then microcontroller 10 exits part 4 and part 2.

e) Microcontroller 10 sets the internal flag ROUT to equal 0 and then exits part 4 and part 2.

5.a) Microcontroller 10 sets SwFig=0.

b) Microcontroller 10 waits a previously determined delay time while printing two blank columns after each letter is finished printing to form the space between characters.

c) Microcontroller 10 determines if the last character in the buffer has been printed, and if so, microcontroller 10 exits part 5 and part 2. If the last character has not been printed microcontroller 10 sets SwFlg=7 and exits part 5 and part 2.

The TIMER INTERRUPT 6.a) Microcontroller 10 checks to see if the internal flag ROUT=1. If the internal flag ROUT equals 0 then the microcontroller 10 goes to step 6.b). If the internal flag ROUT does not equal 0 then the microcontroller 10 goes to step 6.e).

b) Microcontroller 10 sets the time for the printhead 26 dots to be ON for 1.2 milliseconds.

c) Microcontroller 10 turns ON the dots in the printhead 26 through printer driver 30.

d) Microcontroller 10 sets the internal flag ROUT to equal 1.

e) Microcontroller 10 turns OFF the dots in the printhead 26 through printer driver 30.

f) Microcontroller 10 sets the internal flag ROUT to equal 0.

The program steps for each of FIGS. 5 through 7 are as follows:

FIG. 5

PRINT_LINE (PRINT_BUFFER)
1. Set the priority of the TACHO and DELAY interrupts to the highest level. Set the TACHO interrupt enabled. Turn the printer's drive ON
2. Set the PROTECT flag.
3. While (PROTECT > 0).
   if (PRINTING == finished)
      break
4. If(PROTECT == 0)
   {
      ERROR_FLAG = 1;
      Disable the TACHO and DELAY interrupts
   }
5. Turn the printer's drive OFF
6. If(ERROR_FLAG == 1)

```
{
Read the printer temperature
If ( temperature < THRESHOLD)
    turn the PHEAT ON and
    display "WARM UP"
else
    display "PAPER_JAM"
}
```
FIG. 6 (6A and 6B)

TACHO INTERRUPT
1. Set the PROTECT flag. (Set the limit of time to print dot)
2. Read the SwFlg       (Determine step of printing to do)
3. If (SwFlg = 0) {
        If (HOME = LOW) (The printing head is not moved to the first
                        dot position)
            return
        else
            GOTO (5)
   }
4. If (SwFlg = 6)
   {
        If (DELAY is not expired) (The previous step of the routine is
                                    not finished)
            return
        else
            GOTO (5)
   }
5.                      (Initialize the variable)
    5.1 Start DELAY count
    5.2 Set the ROUT flag to 1    (Semaphore to heat unheated
                                    dots for the column to print)
    5.3 CharNmb = CharNmb + 1    (Number of a character from
                                    the Print_Buffer to print)
    5.4 dotNmb = 0    (Number of column to print for CharNmb)
    5.5 cDot = 0      (Set old dot byte to zero)
    5.6 Read the code for CharNmb from the Prin_Buffer (I.E.,
                                    41h for 'A')
    5.7 SwFlg = SwFlg + 1;
    5.8. Return
6. If(SwFlg = 1 . . . 5)        (Print columns 1 . . . 5)
        If (DELAY is not expired) (The previous step of the routine is
                                    not finished)
            return
        else
        {
            6.1 Read Dot_Byte for dotNmb of the CharNmb code from
                EPROM
            6.2 Select the dots which were not heated when the previous
                column was printed using cDot and Dot_Byte
            6.3 Heat these dots
            6.4 cDot = Dot_Byte    (Remember Dot_Byte for next Dot)
            6.6 dotNmb = dotNmb + 1 (Prepare to print the next column)
            6.6 DELAY = 0.3 ms. Start DELAY count
            6.7 Rout flag = 0    (Set the first step of the DELAY
                                    interrupt)
            6.8 SwFlg = SwFlg + 1;
            6.9. Return
        }
7. If (SwFlg = 7)    (Skip 2 blank columns—the space between
                        adjacent characters)
        If (DELAY is not expired) (The previous step of the routine is
                                    not finished)
            return
        else
        {
            7.1 Set DELAY to skip 2 columns
            7.2 If (All print buffer was printed)
                    SwFlg = 8
                else
                    SwFlg = 1
            7.3 Return
        }
8. If (SwFlg = 8)
   {
        8.1 Disable the TACHO interrupt
        8.2 Turn the printer drive OFF
        8.3 SwFlg = 9
        8.4 Return
   }
9. If(SwFlg>8)
   {
        SwFlg = 0
        Return
   }
```
FIG. 7

```
                    TIMER (DELAY) INTERRUPT
1. If(ROUT_FLAG = 0)
   {
        Set the next delay to 1.2 msec
        Turn the dot heating ON for all 1's of DOT_BYTE  (for all
                                    active dots of the column)
        Set the ROUT_FLAG = 1
   }
    else
   {
        Turn the dot heating OFF
        ROUT_FLAG = 0
   }
```

FIG. 8 is a waveform timing diagram for printing the characters of one line, the designated times representing the timing of the following actions:

t0—Power is applied to the printer motor and the printhead 26 begins to move. This starts the generation of the AC Tachometer signal which is used by the microcontroller 10 for printer timing.

t1—The advancement of the printhead, under power from the printer motor, has moved far enough away from the home position to allow the HOME switch to turn ON.

t2—The microcontroller first sets internal flags to control printing and then reads the first character to be printed from the printer buffer into the microcontroller 10.

t3—The first column of seven dots are printed by heating the thermal dots in the printhead. This step is done five times in total to produce a 5×7 dot matrix, which is defined as a single character (when SWFLG=1, 2, 3, 4, 5).

t4—The microcontroller is informed by the TACHO interrupt that the last character in the line has been printed.

t5—The printhead, under power from the printer motor, has returned to its starting position which allows the HOME switch to turn OFF.

t6—The microcontroller 10 removes power from the printer motor which ends the printing process.

Having now described our invention in connection with a particularly illustrated embodiment thereof, variations and modifications of the invention will now naturally occur to those persons normally skilled in the art without departing from the essential scope or spirit of the invention, and accordingly it is intended to claim the same broadly as well as specifically as indicated by the appended claims.

What is claimed is:

1. The method of measuring and recording temperature readings inside a closed compartment by utilizing at least one temperature sensing probe in the compartment which generates a range of signals corresponding to a range of temperatures, calibration means which generates calibration signals, and verifying means for verifying the operability of the temperature sensing probe, consisting of the steps of, a) read six successive calibration signals, discard the highest and lowest readings, and average the remaining four, b) calculate and store a correction term based on the result of step a), c) read six successive temperature signals from the at least one probe, discard the highest and lowest readings, and average the remaining four, d) calculate and store a temperature reading based on the results of steps c) and b), e) heat the probe for a predetermined time interval and then terminate heating, f) read six successive temperature signals from the at least one probe, discard the highest and lowest readings, and average the remaining four, g) compare the readings of steps d) and f); if the reading of step f) is higher than the reading of step d) by a predetermined amount do not add an error flag to the stored reading of step d); if the reading of step f) is not higher than the reading of step d) by a predetermined amount add an error flag to the stored reading of step d).

2. The method of measuring and recording temperature readings inside a closed compartment as set forth in claim 1 wherein said at least one temperature sensing probe consists of a plurality of probes, consisting of the steps of, a) carrying out the calibration steps a) and b), b) carrying out the temperature recording steps c) and d) for each probe of said plurality of probes, c) carrying out heating step e) by heating all probes simultaneously, d) carrying out verifying steps f) and g) for each probe of said plurality of probes.

3. The method of measuring and recording temperature readings inside a closed compartment by utilizing at least one temperature sensing probe in the compartment which generates a range of signals corresponding to a range of temperatures, calibration means which generates calibration signals, and verifying means for verifying the operability of the temperature sensing probe, consisting of the steps of, a) reading six successive calibration signals, discarding the highest and lowest readings, and averaging the remaining four, b) calculating and storing a correction term based on the averaged signal of step a), c) reading six successive temperature signals from the at least one probe, discarding the highest and lowest readings, and averaging the remaining four, d) correcting the temperature reading of step c) by the correction term of step c) and storing the result, e) heating the probe for a predetermined time interval and then terminating heating, f) reading six successive temperature signals from the at least one probe, discarding the highest and lowest readings, and averaging the remaining four, g) comparing the readings of steps d) and f); if the reading of step f) is higher than the reading of step d) by a predetermined amount doing nothing; if the reading of step f) is not higher than the reading of step d) by a predetermined amount adding an error flag to the stored reading of step d).

4. The method of measuring and recording temperature readings inside a closed compartment as set forth in claim 3 wherein said at least one temperature sensing probe consists of a plurality of probes, consisting of the steps of, a) carrying out the calibration steps a) and b), b) carrying out the temperature recording steps c) and d) for each probe of said plurality of probes, c) carrying out heating step e) by heating all probes simultaneously, d) carrying out verifying steps f) and g) for each probe of said plurality of probes.

5. Apparatus for monitoring the temperature in a closed compartment, comprising in combination, a) at least one temperature responsive probe means inside said compartment having an output which generates at said output a range of signals corresponding to a range of temperatures;

b) actuatable verifying means operatively coupled to said probe means and effective when actuated to test said probe means to verify its operability;

c) printing means operable to print the temperature data measured by said temperature responsive probe means, said printing means comprising, a printing head and drive motor, and printing means signals generator means; and d) control means operatively coupled to said verifying means effective to actuate said verifying means at selected time intervals to verify the operability of said probe means, said control means including command means operatively coupled to said printing means to cause the latter to print said temperature data upon command from said command means, and said printing means signal generator means being coupled to said control means and effective during a printing cycle to generate signals representative of the state of the printing means, a particular state of a particular one of such signals indicating a printing means jam and causing said control means to turn off power to said drive motor.

6. Apparatus as set forth in claim 5 wherein said printing means further includes printing means heater means and printing means temperature sensor means, said temperature sensor means monitoring the temperature of said printing means and turning on said printing means heater means when the temperature of said printing means is less than a predetermined temperature.

7. Apparatus for monitoring the temperature in a closed compartment, comprising in combination, a) at least one temperature responsive probe means inside said compartment having an output which generates at said output a range of signals corresponding to a range of temperatures;

b) actuatable verifying means operatively coupled to said probe means and effective when actuated to test said probe means to verify its operability; and c) printing means operable to print the temperature data measured by said temperature responsive probe means, said printing means comprising printing means heater means and printing means temperature sensor means, said temperature sensor means monitoring the temperature of said printing means and turning on said printing means heater means when the temperature of said printing means is less than a predetermined temperature; and d) control means operatively coupled to said verifying means effective to actuate said verifying means at selected time intervals to verify the operability of said probe means, said control means including command means operatively coupled to said printing means to cause the latter to print said temperature data upon command from said command means.

8. Apparatus for monitoring the temperature in a closed compartment, comprising in combination, a) at least one temperature responsive probe means inside said compartment having an output which generates at said output a range of signals corresponding to a range of temperatures;

b) actuatable verifying means operatively coupled to said probe means and effective when actuated to test said probe means to verify its operability;

c) actuatable first means having an input and an output, said input being operatively coupled to said probe means output to receive signals therefrom, and effective when actuated to produce at its output a digital signal corresponding to the temperature indicating probe signal received at its said input;

d) digital storage means for storing signals representing temperatures measured by said probe means;

e) printing means operable to print the temperature data measured by said temperature responsive probe means, said printing means comprising, a printing head and drive motor, printing means heater means, printing means temperature sensor means, and printing means signals generator means, said temperature sensor means monitoring the temperature of said printing means and turning on said printing means heater means when the temperature of said printing means is less than a predetermined temperature f) control means comprising signals processing and control means operatively coupled to all of said first means, said verifying means, and said storage means, effective to actuate each of said means in predetermined sequences at selected time intervals to store in said storage means digital signals representing the temperatures measured by said probe means, and to verify the operability of said probe means, said control means further including command means operatively coupled to said printing means effective to cause said printing means to print said temperature data upon command from said command means, said printing means signals generator means being coupled to said control means and effective during a printing cycle to generate signals representative of the state of the printing means, a particular state of a particular one of such signals indicating a printing means jam and causing said control means to turn off power to said drive motor.

* * * * *